US012679210B2

(12) United States Patent
Misumi et al.

(10) Patent No.: US 12,679,210 B2
(45) Date of Patent: Jul. 14, 2026

(54) INFORMATION PROVIDING DEVICE AND INFORMATION PROVIDING METHOD

(71) Applicants: Nissan Motor Co., Ltd., Kanagawa (JP); RENAULT S.A.S., Boulogne-Billancourt (FR)

(72) Inventors: Ryuma Misumi, Kanagawa (JP); Masahide Nakamura, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 124 days.

(21) Appl. No.: 18/853,606

(22) PCT Filed: Mar. 17, 2023

(86) PCT No.: PCT/IB2023/000131
§ 371 (c)(1),
(2) Date: Oct. 2, 2024

(87) PCT Pub. No.: WO2023/194793
PCT Pub. Date: Oct. 12, 2023

(65) Prior Publication Data
US 2026/0131654 A1 May 14, 2026

(30) Foreign Application Priority Data
Apr. 5, 2022 (JP) .................................. 2022-062765

(51) Int. Cl.
*B60K 35/29* (2024.01)
*B60K 35/81* (2024.01)
*B60W 50/14* (2020.01)

(52) U.S. Cl.
CPC .............. *B60K 35/29* (2024.01); *B60K 35/81* (2024.01); *B60W 50/14* (2013.01)

(58) Field of Classification Search
CPC ........ B60K 35/29; B60K 35/81; B60W 50/14
See application file for complete search history.

(56) References Cited

U.S. PATENT DOCUMENTS 9,511,711 B2 * 12/2016 Petrillo .................. B60K 35/22
10,843,708 B1 * 11/2020 Szybalski ............. B60W 50/14
(Continued)

FOREIGN PATENT DOCUMENTS

| JP | 2006285732 A | | 10/2006 |
|----|--------------|---|---------|
| JP | 2013250854 A | * | 12/2013 |
| JP | 2019027996 A | | 2/2019 |
| JP | 2021067988 A | | 4/2021 |

*Primary Examiner* — Chico A Foxx
(74) *Attorney, Agent, or Firm* — Osha Bergman Watanabe & Burton LLP

(57) ABSTRACT

An information providing device includes an acquisition unit configured to acquire an intersection area on a travel route that is set by autonomous travel control, the intersection area intersecting with an area in which another moving object can move; a recognition unit configured to recognize a travel environment around a subject vehicle; a determination unit configured to determine, based on the travel environment, whether or not the subject vehicle can pass through the intersection area; and a provision unit configured to provide an onboard terminal and/or an electronic terminal in the subject vehicle with information that notifies that the subject vehicle is approaching the intersection area. The provision unit changes the information in accordance with a determination result of the determination unit while the subject vehicle is traveling to the intersection area. The intersection area includes an intersection provided with a traffic light. The recognition unit, when the subject vehicle turns right or left at the intersection, detects as the travel environment an obstacle present at the intersection and a state of the traffic light. The determination unit determines, based on the state of the traffic light, whether or not the subject vehicle can pass through the intersection. The pro- (Continued)

vision unit, when the determination unit determines, based on the state of the traffic light, that the subject vehicle can pass through the intersection, decreases a degree of emphasis of a display portion for the information. The determination unit, after the provision unit decreases the degree of emphasis, determines, based on a detection result of the obstacle present at the intersection, whether or not the subject vehicle can pass through the intersection. The provision unit, when the determination unit determines, based on the detection result of the obstacle present at the intersection, that the vehicle can pass through the intersection, hides the display portion for the information, or stops provision of the information.

13 Claims, 6 Drawing Sheets

(56) References Cited

U.S. PATENT DOCUMENTS

| | | | | |
|---|---|---|---|---|
| 2006/0195257 | A1* | 8/2006 | Nakamura | G01C 21/3632 |
| | | | | 701/437 |
| 2010/0070162 | A1* | 3/2010 | Aihara | G08G 1/005 |
| | | | | 701/533 |
| 2010/0217483 | A1* | 8/2010 | Matsuno | G08G 1/166 |
| | | | | 701/36 |
| 2012/0323487 | A1* | 12/2012 | Sempuku | G09B 29/10 |
| | | | | 701/428 |
| 2015/0260534 | A1* | 9/2015 | Shen | G02B 27/01 |
| | | | | 701/408 |
| 2016/0176399 | A1* | 6/2016 | Takagi | B60W 30/18154 |
| | | | | 701/301 |
| 2018/0088323 | A1* | 3/2018 | Bao | G02B 27/017 |
| 2018/0218600 | A1* | 8/2018 | Fujita | G08G 1/096725 |
| 2022/0144260 | A1* | 5/2022 | Chen | G06N 3/04 |
| 2022/0381579 | A1* | 12/2022 | White | G01C 21/3697 |

* cited by examiner

INFORMATION PROVIDING DEVICE AND INFORMATION PROVIDING METHOD

TECHNICAL FIELD

The present invention relates to an information providing device and an information providing method.

BACKGROUND ART

A display method is known, which is used when displaying a stop state of a subject vehicle having an automated driving function (Patent Document 1). This method includes detecting a surrounding situation of the subject vehicle. In the surrounding situation during the automated driving of the subject vehicle, when the subject vehicle will be in the stop state in the future, a display device is operated to display a stop display that extends upward from the road surface in the surrounding situation.

PRIOR ART DOCUMENT

Patent Document

Patent Document 1: JP2019-27996A

SUMMARY OF INVENTION

Problems to be Solved by Invention

When a vehicle passes through a crosswalk installed with no traffic lights, for example, the vehicle may slow down to ensure that no pedestrians are present. In such a case, in the above conventional technique, whether or not the vehicle needs to make a stop depends on whether or not a pedestrian is present at the crosswalk, and therefore no information is provided to the occupants of the vehicle until a pedestrian is detected crossing the crosswalk and a determination is made that the vehicle needs to make a stop. This results in a problem in that the occupants of the vehicle may feel anxious because, in the above conventional technique, the vehicle approaches the crosswalk without providing any information to the occupants of the vehicle.

A problem to be solved by the present invention is to provide an information providing device and an information providing method that are able to suppress the anxious feeling given to the occupants of the vehicle.

Means for Solving Problems

In a case of acquiring, on a travel route that is set by autonomous travel control, an intersection area intersecting with an area in which another moving object can move, determining, based on an travel environment around a subject vehicle, whether or not the subject vehicle can pass through the intersection area, and providing an onboard terminal and/or an electronic terminal in the subject vehicle with information that notifies that the subject vehicle is approaching the intersection area, the present invention solves the above problem as follows. While the subject vehicle is traveling to the intersection area, the information is changed in accordance with a determination result as to whether or not the subject vehicle can pass through the intersection area. The intersection area includes an intersection provided with a traffic light. When the subject vehicle turns right or left at the intersection provided with the traffic light, an obstacle present at the intersection and a state of the traffic light are detected. When a determination is made, based on the state of the traffic light, that the subject vehicle can pass through the intersection, a degree of emphasis of a display portion for the information is decreased. After the degree of emphasis is decreased, when a determination is made, based on a detection result of the obstacle present at the intersection, that the vehicle can pass through the intersection, provision of the information is stopped.

Effect of Invention

According to the present invention, it is possible to suppress the anxious feeling given to the occupants of the vehicle.

MODE(S) FOR CARRYING OUT THE INVENTION

Hereinafter, one or more embodiments of the present invention will be described with reference to the drawings. The following description is made on the assumption that vehicles travel on the left side in a country having a left-side traffic regulation. In countries having right-side traffic regulations, vehicles travel on the right side, so the left and right in the following description are to be read symmetrically.

<Configuration of Driving Assistance System>

Figure 1:
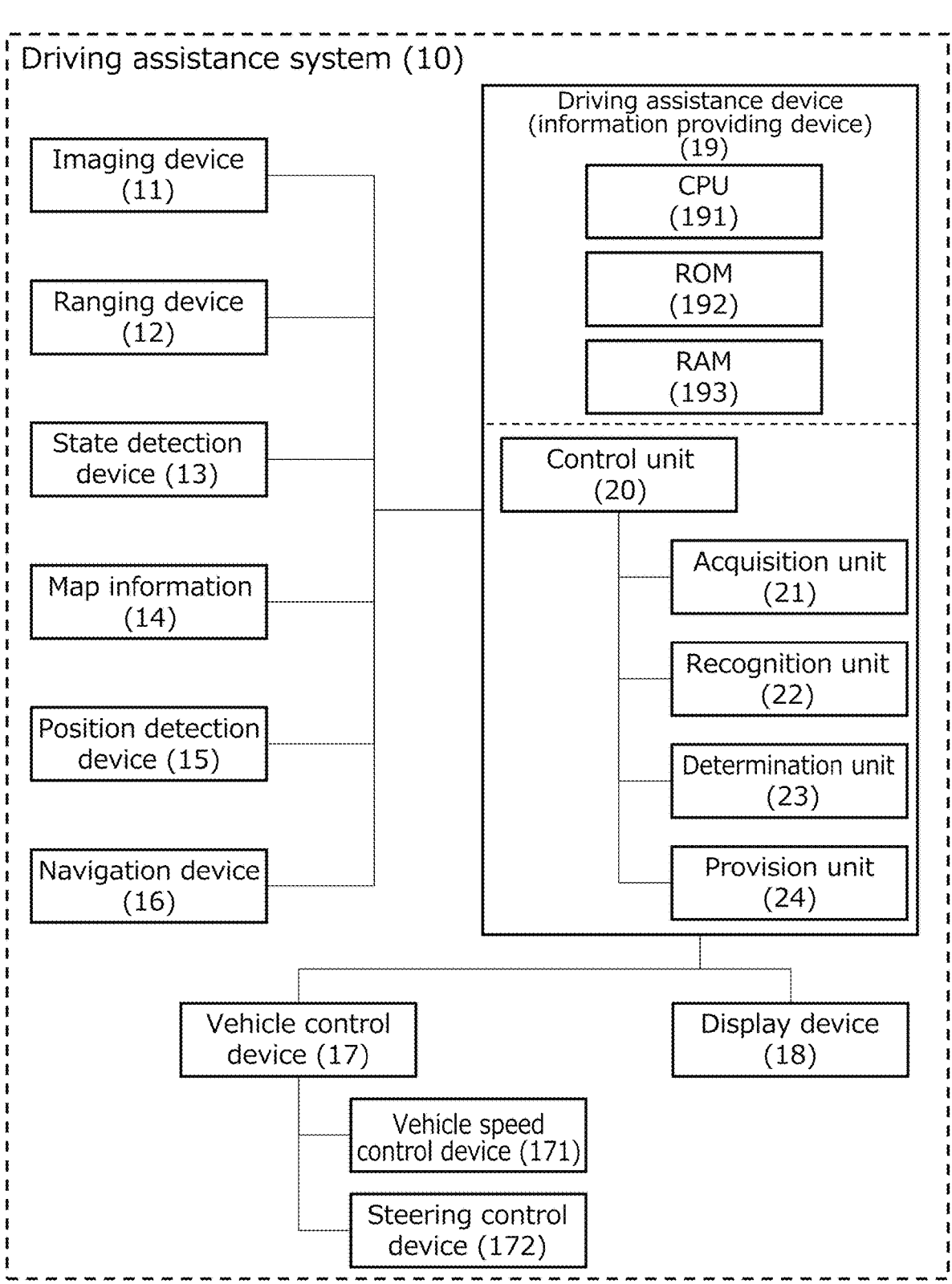
FIG. 1 is a block diagram illustrating an example of a driving assistance system including a driving assistance device according to the present invention.

FIG. 1 is a block diagram illustrating a driving assistance system 10 according to the present invention. The driving assistance system 10 is an onboard system and allows a vehicle to travel by autonomous travel control to a destination that is set by an occupant of the vehicle (occupants of the vehicle include the driver). The autonomous travel control refers to autonomously controlling the traveling operations of the vehicle using a driving assistance device, which will be described later. The traveling operations include all traveling operations such as acceleration, deceleration, starting, stopping, turning to the right or left, changing lanes, and pulling over. Autonomously controlling the traveling operations means that the driving assistance device controls the traveling operations using devices of the vehicle. That is, the driving assistance device intervenes and controls these traveling operations to a certain extent that is preliminarily determined. Traveling operations that do not require intervention are manually operated by the driver.

As illustrated in FIG. 1, the driving assistance system 10 includes an imaging device 11, a ranging device 12, a state detection device 13, map information 14, a position detection device 15, a navigation device 16, a vehicle control device 17, a display device 18, and a driving assistance device 19. In addition, as illustrated in FIG. 1, the driving assistance device 19 of the present embodiment includes, as a part thereof, an information providing device having an information providing function. The devices constituting the driving assistance system 10 are connected via a controller area network (CAN) or other onboard LAN and can exchange information with each other.

The imaging device 11 is a device that recognizes objects around the vehicle using images. The imaging device 11 may be, for example, one or more cameras such as cameras including CCDs or other imaging elements, ultrasonic cameras, or infrared cameras. Two or more imaging devices 11 can be provided in one vehicle. For example, such imaging devices 11 may be arranged in the front grille portion of the vehicle, below the right and left door mirrors, and near the rear bumper. This can reduce blind spots when recognizing objects around the vehicle.

The ranging device 12 is a device for calculating the relative distance and relative speed between the vehicle and an object. The ranging device 12 may be, for example, one or more radar devices or sonars, such as laser radars, millimeter wave radars, other similar radars (LRF and the like), light detection and ranging (LiDAR) units, and ultrasonic radars. Two or more ranging devices 12 can be provided in one vehicle. For example, such ranging devices 12 may be arranged at the front, right side, left side, and rear of the vehicle. This allows the relative distance and relative speed between the vehicle and a surrounding object to be calculated accurately.

Objects detected with the imaging device 11 and ranging device 12 are lane boundary lines of roads, center lines, road surface signs, median strips, guardrails, curbstones, highway side walls, road signs, traffic lights, crosswalks, construction sites, accident sites, traffic restrictions, etc. Objects also include obstacles that may affect the travel of the vehicle, such as automobiles (other vehicles) other than the subject vehicle, motorcycles (motorbikes), bicycles, and pedestrians. The detection results of the imaging device 11 and ranging device 12 are acquired by the driving assistance device 19 at predetermined time intervals as necessary.

The detection results of the imaging device 11 and ranging device 12 can be integrated or synthesized (so-called sensor fusion) by the driving assistance device 19. This can complement missing information about the detected objects. For example, the driving assistance device 19 can calculate the positional information of an object using the self-position information, which represents the position of the vehicle traveling, and the relative position (distance and direction) between the vehicle and the object. The self-position information is acquired by the position detection device 15. The calculated positional information of the object is integrated with multiple information items such as the detection results of the imaging device 11 and ranging device 12 and the map information 14 in the driving assistance device 19 and used as travel environmental information around the vehicle. Additionally or alternatively, the detection results of the imaging device 11 and ranging device 12 and the map information 14 can be used to recognize objects around the vehicle and predict their movements.

The state detection device 13 is a device for detecting the traveling state of the vehicle. Examples of the state detection device 13 include a vehicle speed sensor, an acceleration sensor, a yaw rate sensor (e.g., a gyro sensor), a steering angle sensor, and an inertial measurement unit. These devices are not particularly limited, and known devices can be used. The arrangement and number of these devices can be set as appropriate within a range in which the traveling state of the vehicle can be appropriately detected. The detection results of each device are acquired by the driving assistance device 19 at predetermined time intervals as necessary.

The map information 14 is information used for generation of a travel route, control of traveling operations, etc. and includes road information, facility information, and their attribute information. The road information and road attribute information include information on a road width, a radius of curvature of a road, a road shoulder structure, a road traffic regulation (speed limit, whether lane change is permitted), a merging point and a branching point of a road, a position at which the number of lanes increases/decreases, and other similar information. The map information 14 is high-definition map information that allows the movement trajectory for each lane to be perceived, and includes two-dimensional positional information and/or three-dimensional positional information at each map coordinate, road/lane boundary information at each map coordinate, road attribute information, lane inbound/outbound information, lane identification information, connection destination lane information, etc.

The road/lane boundary information of the high-definition map information is information that represents a boundary between the travel route on which the vehicle travels and another area. The travel route on which the vehicle travels refers to a road for the vehicle to travel, and the form of the travel route is not particularly limited. The boundary exists on each of the right and left sides with respect to the traveling direction of the vehicle, and the form of the boundary is not particularly limited. The boundary is, for example, a road mark or a road structure. Examples of road marks include lane boundary lines and center lines. Examples of road structures include median strips, guardrails, curbstones, tunnels, and highway side walls. At a point at which the travel route boundary cannot be clearly specified, such as inside an intersection, a boundary is preliminarily set on the travel route. This boundary is an imaginary boundary, rather than a road mark or a road structure that actually exists.

The map information 14 is stored in a readable state in a recording medium provided in the driving assistance device 19, an onboard device, or a server on a network. The driving assistance device 19 acquires the map information 14 as necessary.

The position detection device 15 is a positioning system for detecting the current position of the vehicle and is not particularly limited, and a known device can be used. The position detection device 15 calculates the current position of the vehicle, for example, from radio waves or the like received from satellites for a global positioning system (GPS). Additionally or alternatively, the position detection device 15 may estimate the current position of the vehicle from the vehicle speed information and acceleration information acquired from the vehicle speed sensor, the acceleration sensor, and the gyro sensor, which are each the state detection device 13, and cross-check the estimated current position with the map information 14 thereby to calculate the current position of the vehicle.

The navigation device 16 is a device that refers to the map information 14 to calculate a travel route from the current position of the vehicle detected by the position detection device 15 to a destination that is set by an occupant (occupants include the driver). The navigation device 16 uses the road information, facility information, etc. of the map information 14 to search for a travel route for the vehicle to reach the destination from the current position. The travel route includes at least information on the road on which the vehicle travels, the travel lane, and the traveling direction of the vehicle, and is displayed, for example, in a linear format. There may be two or more travel routes depending on the search conditions. The travel route calculated by the navigation device 16 is output to the driving assistance device 19.

The vehicle control device 17 is an onboard computer such as an electronic control unit (ECU) and electronically controls onboard equipment that is responsible for the travel of the vehicle. The vehicle control device 17 includes a vehicle speed control device 171 that controls the traveling speed of the vehicle, and a steering control device 172 that controls the steering operation of the vehicle. The vehicle speed control device 171 and the steering control device 172 autonomously control the operations of drive device and steering device in accordance with control signals that are input from the driving assistance device 19. This allows the vehicle to autonomously travel along the set travel route. Information necessary for autonomous control by the vehicle speed control device 171 and the steering control device 172, such as the traveling speed, acceleration, steering angle, and attitude of the vehicle, is acquired from the state detection device 13.

Examples of the drive device controlled by the vehicle speed control device 171 include an electric motor and/or an internal-combustion engine as the traveling drive sources, a power transmission device including a drive shaft and an automatic transmission that transmit the output of the traveling drive sources to the drive wheels, a drive device that controls the power transmission device, etc. The braking device controlled by the vehicle speed control device 171 is, for example, a braking device that brakes the wheels. Control signals corresponding to the set traveling speed are input to the vehicle speed control device 171 from the driving assistance device 19. The vehicle speed control device 171 generates signals for controlling these components of the drive device based on the control signals that are input from the driving assistance device 19, and transmits the signals to the drive device thereby to autonomously control the traveling speed of the vehicle.

On the other hand, the steering device controlled by the steering control device 172 is a steering device that controls the steered wheels in accordance with the steering angle of the steering wheel, and examples of the steering device include a steering actuator such as a motor attached to a column shaft of the steering wheel. The steering control device 172 autonomously controls the operation of the steering device based on the control signals input from the driving assistance device 19 so that the vehicle travels while maintaining a predetermined lateral position (position in the right-left direction of the vehicle) with respect to the set travel route. This control uses at least one of the detection results of the imaging device 11 and ranging device 12, the traveling state of the vehicle acquired with the state detection device 13, the map information 14, and the information on the current position of the vehicle acquired with the position detection device 15.

The display device 18 is a device for providing necessary information to the occupants of the vehicle. For example, the display device 18 is a liquid crystal display provided on an instrument panel or a projector such as a head-up display (HUD). The display device 18 may include an input device for an occupant of the vehicle to input instructions to the driving assistance device 19. Examples of the input device include a touch panel for inputting with a user's finger or a stylus pen, a microphone for acquiring voice instructions from the user, and a switch attached to the steering wheel of the vehicle. The display device 18 may include a speaker as an output device.

The driving assistance device 19 is a device for controlling the travel of the vehicle by controlling the devices constituting the driving assistance system 10 to cooperate with each other so that the vehicle travels to the set destination. The destination is set, for example, by an occupant of the vehicle. The driving assistance device 19 is, for example, a computer and includes a central processing unit (CPU) 191 that is a processor, a read only memory (ROM) 192 that stores programs, and a random access memory (RAM) 193 that serves as an accessible storage device. The CPU 191 is an operating circuit for achieving the functions of the driving assistance device 19 by executing the programs stored in the ROM 192.

The driving assistance device 19 has a driving assistance function of allowing the vehicle to travel to a set destination using autonomous travel control. In addition, the driving assistance device 19 of the present embodiment includes an information providing device as a part thereof. The information providing device has, as information providing functions, an intersection area acquisition function of acquiring an intersection area on a travel route, the intersection area intersecting with an area in which another moving object can move, a travel environment recognition function of recognizing a travel environment around the subject vehicle, a passage determination function of determining whether or not the vehicle can pass through the intersection area, and an approach notification function of providing the occupants of the subject vehicle with information notifying that the subject vehicle is approaching the intersection area. The programs stored in the ROM 192 include those for achieving these functions, and the CPU 191 executes the programs stored in the ROM 192 thereby to achieve these functions. In FIG. 1, each function is extracted and illustrated as a functional block for descriptive purposes.

<Functions of Functional Blocks>

The functions achieved by a control unit 20, an acquisition unit 21, a recognition unit 22, a determination unit 23, and a provision unit 24, which are functional blocks, will be described below with reference to FIGS. 2A to 2C.

The control unit 20 has a function of allowing the vehicle to travel to a set destination using the autonomous travel control (i.e., a driving assistance function). When using the driving assistance function to execute driving assistance, the driving assistance device 19 displays an image illustrating the travel environment of the subject vehicle on the display device 18. FIG. 2A is a diagram illustrating an example of an image displayed on the display device 18. The image illustrated in FIG. 2A is a bird's-eye view image acquired when setting a virtual viewpoint diagonally above behind a subject vehicle V and capturing an image ahead of the subject vehicle V from the viewpoint position. The bird's-eye view image is displayed with information, such as on the lanes and signs of the road on which the subject vehicle V travels, the traveling position of the subject vehicle V, and obstacles present around the subject vehicle V.

Figure 2A:
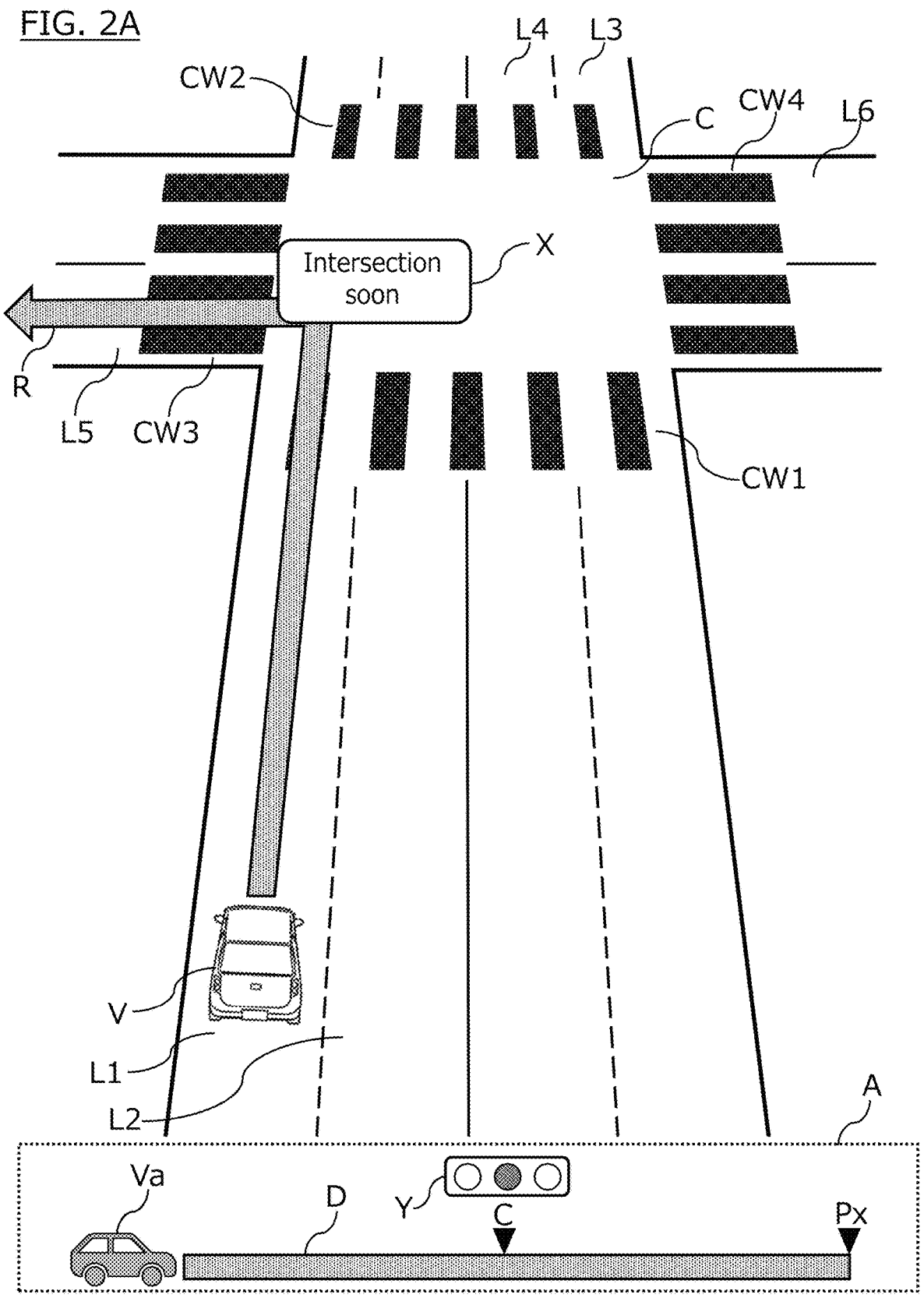
FIG. 2A is a diagram (part 1) illustrating an example of an image displayed when the driving assistance is executed by the driving assistance system illustrated in FIG. 1.

The image illustrated in FIG. 2A is a two-dimensional image created by computer graphics (CG), but the image illustrating the travel environment of the subject vehicle V displayed on the display device 18 is not limited to this. For example, the image illustrating the travel environment may also be a three-dimensional image or an image acquired by the imaging device 11. In addition, an image created by CG may be superimposed on the image acquired by the imaging device 11.

The travel scene illustrated in FIG. 2A corresponds to an actual travel scene of the subject vehicle V. That is, in the travel scene illustrated in FIG. 2A, the subject vehicle V is traveling on a road with two lanes on each side. The traveling direction of vehicles in lanes L1 and L2 is from the lower side to upper side (from the near side to far side) of the drawing, and the traveling direction of vehicles in lanes L3 and L4 is from the upper side to lower side (from the far side to near side) of the drawing. The road on which the subject vehicle V is traveling intersects with a road with one lane on each side ahead of the subject vehicle V. On the road with one lane on each side, the traveling direction of vehicles in a lane L5 is from the right side to left side of the drawing, and the traveling direction of vehicles on a lane L6 is from the left side to right side of the drawing.

As illustrated in FIG. 2A, the area in which the two roads intersect is an intersection C. The intersection C is provided with crosswalks CW1 and CW2 for pedestrians and bicycles to cross the road with two lanes on each side and crosswalks CW3 and CW4 for pedestrians and bicycles to cross the road with one lane on each side. In addition, it is assumed that the intersection C is installed with traffic lights. In the travel scene illustrated in FIG. 2A, it is assumed that vehicles traveling in the lanes L1 and L3 can travel straight ahead or turn left at the intersection C and vehicles traveling in the lanes L2 and L4 can travel straight ahead or turn right at the intersection C. In addition, it is assumed that a destination Px (not illustrated) is set by an occupant of the subject vehicle V at a position that can be reached after traveling straight ahead in the lane L5 to the left side of the drawing.

In this case, the navigation device 16 uses the driving assistance function of the control unit 20 to set a travel route R of the subject vehicle V. For example, the navigation device 16 sets the travel route R illustrated in FIG. 2A. The travel route R is a route for traveling in the lane L1, turning left at the intersection C, traveling in the lane L5, and arriving at the destination Px. As illustrated in FIG. 2A, the subject vehicle V travels in the lane L1 along the travel route R.

The travel of the subject vehicle V is controlled by the autonomous travel control using the driving assistance function of the driving assistance device 19. A plurality of assistance levels are set for the driving assistance executed by the driving assistance device 19. The assistance levels are those indicating an extent to which the driving assistance device 19 intervenes in the control of the driving operations of the subject vehicle V (i.e., an extent to which the driver's manual operation intervenes). The driving assistance device 19 uses its driving assistance function to achieve the driving assistance defined at each assistance level. The assistance levels can be set, for example, based on the driving automation levels defined in SAE J3016: September 2016, Taxonomy and Definitions for Terms Related to Driving Automation Systems for On-Road Motor Vehicles, published by the Society of Automotive Engineers (SAE).

In the travel scene illustrated in FIG. 2A, it is assumed that the driving assistance device 19 is executing the driving assistance, for example, at an assistance level 4 that is a level at which the driving assistance device 19 executes all driving tasks of the subject vehicle V and continuously executes, in a limited area, a response to cases in which continued control is difficult. In this case, when approaching the intersection C, the driving assistance device 19 decelerates the subject vehicle V and detects the state of the traffic lights installed at the intersection C and pedestrians and bicycles crossing the crosswalks CW1 and CW3. Then, when the state of the traffic lights does not instruct the subject vehicle V to make a stop and there are no pedestrians or bicycles crossing the crosswalk CW1 or CW3, the driving assistance device 19 determines that the subject vehicle V can turn left at the intersection C and enters the intersection C.

When this series of determinations and autonomous travel control are executed by the driving assistance device 19, if appropriate information cannot be provided to the occupants of the subject vehicle V, the occupants of the subject vehicle V will feel anxious. That is, if the subject vehicle V enters the intersection C by the autonomous travel control without determining the state of the traffic lights and without providing a determination and its result to avoid contact with pedestrians or bicycles, the occupants of the subject vehicle V may become anxious that the subject vehicle V may suddenly make a stop before or in the intersection C. The driving assistance device 19 of the present embodiment therefore controls the display device 18 so as to be able to provide the occupants of the subject vehicle V with appropriate information. This control is achieved mainly by the functions of the acquisition unit 21, recognition unit 22, determination unit 23, and provision unit 24.

The acquisition unit 21 has a function of acquiring an intersection area (i.e., the intersection area acquisition function) on the travel route R that is set by the autonomous travel control. The intersection area intersects with an area in which other moving objects can move. The other moving objects refer to traffic participants other than the subject vehicle V, such as other vehicles, motorcycles, bicycles, and pedestrians. The area in which other moving objects can move refers to an area in which traffic participants other than the subject vehicle V can move when moving from their current positions to their destinations. For example, the area in which pedestrians can move is an area in which pedestrians can walk, such as a sidewalk, a crosswalk, or a footbridge. The area in which other vehicles and motorcycles can move is an area of a road in which these can travel like the subject vehicle V.

The driving assistance device 19 uses the intersection area acquisition function of the acquisition unit 21 to acquire the travel route R from the navigation device 16. Then, the driving assistance device 19 acquires the intersection area on the travel route R. The intersection area intersects with an area in which other moving objects can move. The travel route R intersecting with an area in which other moving objects can move means that when a traffic participant other than the subject vehicle V is present in an area in which the traffic participant can move, if the subject vehicle V travels along the travel route R, the subject vehicle V and the other moving object will come into contact with each other. That is, in this situation, the travel route R of the subject vehicle V and the area in which the traffic participant other than the subject vehicle V can move are present on the same plane, and when viewed in a plane, the travel route R of the subject vehicle V overlaps with part or all of the area in which the traffic participant other than the subject vehicle V can move.

For example, when a crosswalk is present on the travel route R and a pedestrian is present on the crosswalk, if the subject vehicle V travels along the travel route R, the subject vehicle V will come into contact with the pedestrian. The crosswalk present on the travel route R is therefore an intersection area. In contrast, when a footbridge is present on the travel route R and a pedestrian is walking on the footbridge, even if the subject vehicle V travels along the travel route R, the subject vehicle V and the pedestrian will not come into contact with each other. This is because the road on which the subject vehicle V travels and the footbridge on which the pedestrian walks are not present on the same plane.

The map information 14 includes road information of the roads which the subject vehicle V passes through when traveling along the travel route R. The map information 14 also includes information on the areas in which traffic participants other than the subject vehicle V can move on the roads which the subject vehicle V passes through, and attributes of the areas. The driving assistance device 19 can therefore use the intersection area acquisition function of the acquisition unit 21 to extract the intersection areas present on the travel route R.

Specific examples of intersection areas include an intersection at which a road on which the subject vehicle V travels intersects with a road on which other vehicles travel, and a crosswalk installed on a road on which the subject vehicle V travels. In addition, in a case in which the subject vehicle V enters a facility located at a position facing a road, when a sidewalk is provided between the roadway and the facility, the sidewalk facing the facility is an intersection area. That is, when a pedestrian is walking on the sidewalk between the facility and the roadway, if the subject vehicle V enters the facility, the subject vehicle V and the pedestrian will come into contact with each other, so the sidewalk is an intersection area.

In the case of the travel scene illustrated in FIG. 2A, when another vehicle is present in the intersection C, if the subject vehicle V enters the intersection C, the subject vehicle V may come into contact with the other vehicle. The intersection C is therefore an intersection area. In addition, when the subject vehicle V travels straight through the intersection C, if a pedestrian or a bicycle is crossing the crosswalk CW1 or CW2, the subject vehicle V may come into contact with the pedestrian or the bicycle. The crosswalks CW1 and CW2 are therefore intersection areas. Likewise, when the subject vehicle V turns left at the intersection C, the crosswalks CW1 and CW3 are intersection areas, while when the subject vehicle V turns right at the intersection C, the crosswalks CW1 and CW4 are intersection areas.

The recognition unit 22 has a function of recognizing the travel environment around the subject vehicle V (i.e., the travel environment recognition function). The driving assistance device 19 uses the travel environment recognition function of the recognition unit 22 to recognize the travel environment of the subject vehicle V through acquiring the detection results of the imaging device 11 and ranging device 12 and performing processes such as pattern matching and sensor fusion on the acquired detection results. For example, the driving assistance device 19 detects another vehicle traveling around the subject vehicle V from the detection result of the imaging device 11 and detects, from the detection result of the ranging device 12, the distance from the subject vehicle V to the other vehicle and the direction in which the other vehicle is present relative to the subject vehicle V. The driving assistance device 19 thus recognizes the position of the other vehicle relative to the subject vehicle V. Additionally or alternatively, the driving assistance device 19 detects a pedestrian crossing the crosswalk ahead of the subject vehicle V from the detection result of the imaging device 11 and detects the distance from the subject vehicle V to the pedestrian from the detection result of the ranging device 12. The driving assistance device 19 thus recognizes the position of the pedestrian relative to the subject vehicle V.

The intersection C, which is an intersection area, may be installed with traffic lights. In order to recognize the state of the traffic lights as the travel environment, the driving assistance device 19 uses the travel environment recognition function of the recognition unit 22 to determine whether or not a traffic light is present ahead of the subject vehicle V from the detection result of the imaging device 11 and the map information 14. Then, when a determination is made that a traffic light is present ahead of the subject vehicle V, the driving assistance device 19 detects the state of the traffic light as the travel environment. The state of the traffic light is, for example, the state of lighting of the traffic light, and specific examples include a red light state of the traffic light (i.e., the subject vehicle V must make a stop before the intersection C), a yellow light state of the traffic light (i.e., the subject vehicle V cannot enter the intersection C except a case in which the subject vehicle V cannot make a stop), and a green light state of the traffic light (i.e., the subject vehicle V can enter the intersection C). The state of the traffic light is detected from the image acquired by the imaging device 11.

In the case of the travel scene illustrated in FIG. 2A, the driving assistance device 19 uses the travel environment recognition function of the recognition unit 22 to detect a preceding vehicle and a following vehicle traveling in the lane L1, a vehicle traveling in the lane L2 parallel to the subject vehicle, and oncoming vehicles traveling in the lanes L3 and L4, for example, as other vehicles. Then, the driving assistance device 19 recognizes the positions of the other vehicles traveling around the subject vehicle V from the directions and distances of the other vehicles relative to the subject vehicle V. In the travel scene illustrated in FIG. 2A, no vehicles other than the subject vehicle V are traveling, so it is recognized that there are no other vehicles traveling around the subject vehicle V. In addition, the driving assistance device 19 detects pedestrians crossing the crosswalks CW1, CW2, CW3, and CW4 and recognizes the presence of pedestrians as the travel environment of the subject vehicle V. In the travel scene illustrated in FIG. 2A, no pedestrians are detected, so it is recognized that there are no pedestrians around the subject vehicle V. Furthermore, the driving assistance device 19 determines whether or not a traffic light is installed at the intersection C. In the travel scene illustrated in FIG. 2A, it is assumed that traffic lights are installed at the intersection C and the state of the traffic lights is a yellow light state.

The determination unit 23 has a function of determining, based on the travel environment of the subject vehicle V recognized by the travel environment recognition function, whether or not the subject vehicle V can pass through the intersection area (i.e., the passage determination function). The driving assistance device 19 uses the passage determination function of the determination unit 23 to determine whether or not an obstacle is present in the intersection area, and when determining that no obstacle is present in the intersection area, the driving assistance device 19 determines that the subject vehicle V can pass through the intersection area. On the other hand, when determining that an obstacle is present in the intersection area, the driving assistance device 19 determines that the subject vehicle V cannot pass through the intersection area.

In addition to this, when a traffic light is installed in the intersection area (specifically, at the intersection C), the driving assistance device 19 determines whether or not the state of the traffic light is a state of instructing to make a stop. Then, when determining that the state of the traffic light is a state of instructing to make a stop (i.e., the red light state), the driving assistance device 19 determines that the subject vehicle V cannot pass through the intersection area, while when determining that the state of the traffic light is not a state of instructing to make a stop (i.e., the green light state), the driving assistance device 19 determines that the subject vehicle V can pass through the intersection area.

As for the yellow light state, the driving assistance device 19 determines, based on the traveling state of the subject vehicle V (particularly the traveling speed of the subject vehicle V) and the distance from the subject vehicle V to the intersection area (intersection C), whether or not the subject vehicle V can make a stop before the intersection C. When determining that the subject vehicle V cannot make a stop before the intersection C, the driving assistance device 19 determines that the state of the traffic light is not a state of instructing to make a stop and that the subject vehicle V can pass through the intersection area. On the other hand, when determining that the subject vehicle V can make a stop before the intersection C, the driving assistance device 19 determines that the state of the traffic light is a state of instructing to make a stop and that the subject vehicle V cannot pass through the intersection area.

Thus, such as in the case of an intersection installed with traffic lights, provided that it is necessary to determine the presence or absence of an obstacle in the intersection area and the state of the traffic lights, when determining that no obstacle is present in the intersection area and the state of the traffic lights is not a state of instructing to make a stop, the driving assistance device 19 determines that the subject vehicle V can pass through the intersection area. In contrast, when determining that an obstacle is present in the intersection area or when determining that the state of the traffic lights is a state of instructing to make a stop, the driving assistance device 19 determines that the subject vehicle V cannot pass through the intersection area. Also when the subject vehicle V makes a stop before the intersection area and then makes a start, the driving assistance device 19 determines whether or not the subject vehicle V can pass through the intersection area. For example, when the subject vehicle V makes a stop before the intersection C in accordance with a stop signal and then makes a start, the driving assistance device 19 determines whether or not the subject vehicle V can pass through the intersection C.

In the case of the travel scene illustrated in FIG. 2A, the intersection C is installed with traffic lights, and the driving assistance device 19 therefore determines the presence or absence of an obstacle in the intersection C and the state of the traffic lights. Regarding the presence or absence of an obstacle, in the travel scene illustrated in FIG. 2A, the driving assistance device 19 uses the travel environment recognition function to recognize, as the travel environment, that there are no other vehicles traveling around the subject vehicle V and that there are no pedestrians around the subject vehicle V. The driving assistance device 19 therefore determines that there are no other vehicles or pedestrians at the intersection C. In contrast, regarding the state of the traffic lights, in the travel scene illustrated in FIG. 2A, the driving assistance device 19 uses the travel environment recognition function to recognize that the state of the traffic lights is a yellow light state. In the travel scene illustrated in FIG. 2A, it is assumed that the distance from the subject vehicle V to the intersection C is sufficient for the subject vehicle V to make a stop before the intersection C. In this case, the driving assistance device 19 determines that the state of the traffic lights is a state of instructing to make a stop. In the travel scene illustrated in FIG. 2A, therefore, the driving assistance device 19 determines that the subject vehicle V cannot pass through the intersection area.

The provision unit 24 has a function of providing an onboard terminal and/or an electronic terminal in the subject vehicle V with information that notifies that the subject vehicle V is approaching an intersection area (i.e., an approach notification function). The onboard terminal and electronic terminal of the subject vehicle V are represented, for example, by the display device 18, but are not limited to this, and examples thereof include a display portion of the instrument panel of the subject vehicle V, a terminal for providing information to the occupants of the subject vehicle V when executing the driving assistance at the above-described assistance level 3 or 4, etc. The driving assistance device 19 uses the approach notification function of the provision unit 24 with the onboard terminal and/or electronic terminal of the subject vehicle V to provide the occupants of the subject vehicle V with information that notifies that the subject vehicle V is approaching an intersection area. In addition, while the subject vehicle V is traveling from its current position to the intersection area, the driving assistance device 19 repeatedly performs the process of passage determination using the passage determination function. Then, the driving assistance device 19 changes the information provided to the onboard terminal and/or electronic terminal in the subject vehicle V (i.e., the information provided to the occupants of the subject vehicle V) in accordance with the obtained determination results.

The information notifying that the subject vehicle V is approaching an intersection area includes information about the intersection area which the subject vehicle V is approaching. For example, that information includes information indicating which of an intersection, a crosswalk, and a sidewalk facing a facility that allows the subject vehicle V to enter, the intersection area corresponds to. In addition to this, that information may include information indicating the distance from the current position of the subject vehicle V to the intersection area. The driving assistance device 19 acquires the current position of the subject vehicle V from the position detection device 15, and when the distance from the current position of the subject vehicle V to the intersection area becomes equal to or less than a predetermined distance, the driving assistance device 19 provides information notifying that the subject vehicle V is approaching the intersection area. The predetermined distance is set as an appropriate distance within a range in which an obstacle in the intersection area can be detected using the imaging device 11 and ranging device 12 of the subject vehicle V, etc.

In addition to this, the information provided by the driving assistance device 19 includes information in accordance with a determination result as to whether or not the subject vehicle V can pass through the intersection area and information regarding the determination of whether or not the subject vehicle V can pass through the intersection area. Specific examples of such information include information indicating whether or not an obstacle is present in the intersection area, information indicating the type of obstacle (i.e., traffic participant) present in the intersection area, information indicating the lighting state of traffic lights installed in the intersection area, and information indicating whether or not the subject vehicle V can pass through the intersection area. These information items are displayed on the display device 18 to display them to the occupants of the subject vehicle V, but instead of this, they may be output as a voice message from a speaker provided in the display device 18. That is, the occupants may be notified that the vehicle is approaching an intersection area only by a voice message such as "You will reach an intersection soon." The same applies to the information in accordance with the determination result as to whether or not the subject vehicle V can pass through the intersection area and the information regarding the determination of whether or not the subject vehicle V can pass through the intersection area. A recorded voice message or synthetic voice message may be used for the voice message.

These information items may be displayed together with the distance from the subject vehicle V to the intersection area. Alternatively or in addition to this, these information items may be displayed at the position of the intersection area on the travel route R displayed on the display device 18. Alternatively or in addition to this, these information items may be displayed by superimposing them on an image of the outside of the vehicle acquired from the imaging device 11. The display device 18 on which these information items are displayed includes not only a display equipped in the subject vehicle V but also a display of a terminal possessed by an occupant of the subject vehicle V. In the case of an unmanned taxi or the like in which the driving assistance device 19 executes all driving tasks of the subject vehicle V and a supervisor monitors the travel of the subject vehicle V at a remote location away from the subject vehicle V, the above-described information may be displayed on a display provided on a terminal for monitoring the travel of the subject vehicle V.

In the case of the travel scene illustrated in FIG. 2A, the subject vehicle V is approaching the intersection C and needs to decelerate or make a stop, so an image (icon) X with "Intersection soon" written on it is displayed on the display device 18. The image X represents information that notifies that the subject vehicle V is approaching an intersection area. The position at which the image X is displayed is the position of the intersection C on the travel route R displayed on the display device 18. This allows the occupants of the subject vehicle V to confirm that the driving assistance device 19 recognizes that the subject vehicle V is approaching the intersection C. Additionally or alternatively, when the image X is displayed, a sound effect may be output from a speaker provided on the display device 18. The timing of outputting the sound effect is, for example, the same as the display of the image X.

In an area A, an image Y indicating the lighting state of a traffic light is displayed together with an image Va indicating the subject vehicle V and an image D indicating the distance from the subject vehicle V to the intersection C. The distance from the left end of the image D to the position indicated by a black triangle C corresponds to the distance from the subject vehicle V to the intersection C. and the distance from the left end to right end of the image D corresponds to the distance from the subject vehicle V to the destination Px. The image Y illustrated in FIG. 2A represents a horizontal traffic light, which corresponds to the green, yellow, and red light states from the left. The image Y illustrated in FIG. 2A indicates the yellow light state corresponding to the lighting state of the traffic light at the intersection C.

The driving assistance device 19 changes the information provided to the occupants of the subject vehicle V in accordance with the determination result obtained by the passage determination function. Specifically, when determining that the subject vehicle V cannot pass through the intersection area, the driving assistance device 19 increases the degree of emphasis of the display portion for the information displayed on the display device 18. For example, the driving assistance device 19 executes at least one of enlarging the size of the display portion for the information, heightening the color of the display portion for the information, increasing the brightness of the display portion for the information, decreasing the transparency of the display portion for the information, and executing a performance that emphasizes the display portion for the information. Examples of a performance that emphasizes the display portion for the information include making the display portion for the information blink. In this case, a sound effect that calls the attention of the occupants may be output from a speaker provided in the display device 18. In the case in which the display portion for the information is already emphasized, when determining that the subject vehicle V cannot pass through the intersection area, the driving assistance device 19 may maintain the display form of the information without changing the degree of emphasis of the display portion for the information displayed on the display device 18.

On the other hand, when determining that the subject vehicle V can pass through the intersection area, the driving assistance device 19 decreases the degree of emphasis of the display portion for the information displayed on the display device 18. For example, the driving assistance device 19 executes at least one of reducing the size of the display portion for the information, diluting the color of the display portion for the information, lowering the brightness of the display portion for the information, increasing the transparency of the display portion for the information, and executing a performance that makes the display portion for the information less noticeable. Examples of a performance that makes the display portion for the information less noticeable include making the display portion for the information fade out. When determining that the subject vehicle V can pass through the intersection area, the driving assistance device 19 may hide the display portion for the information displayed on the display device 18 and stop provision of the information. In particular, when determining, before the subject vehicle V passes through the intersection area, that the subject vehicle V can pass through the intersection area, even before the subject vehicle V passes through the intersection area, the driving assistance device 19 hides the information notifying that the subject vehicle V is approaching the intersection area and stops provision of the information. This can notify the occupants of the subject vehicle V that the driving assistance device 19 allows the vehicle to travel after determining whether or not it is possible to pass through the intersection area.

Figure 2B:
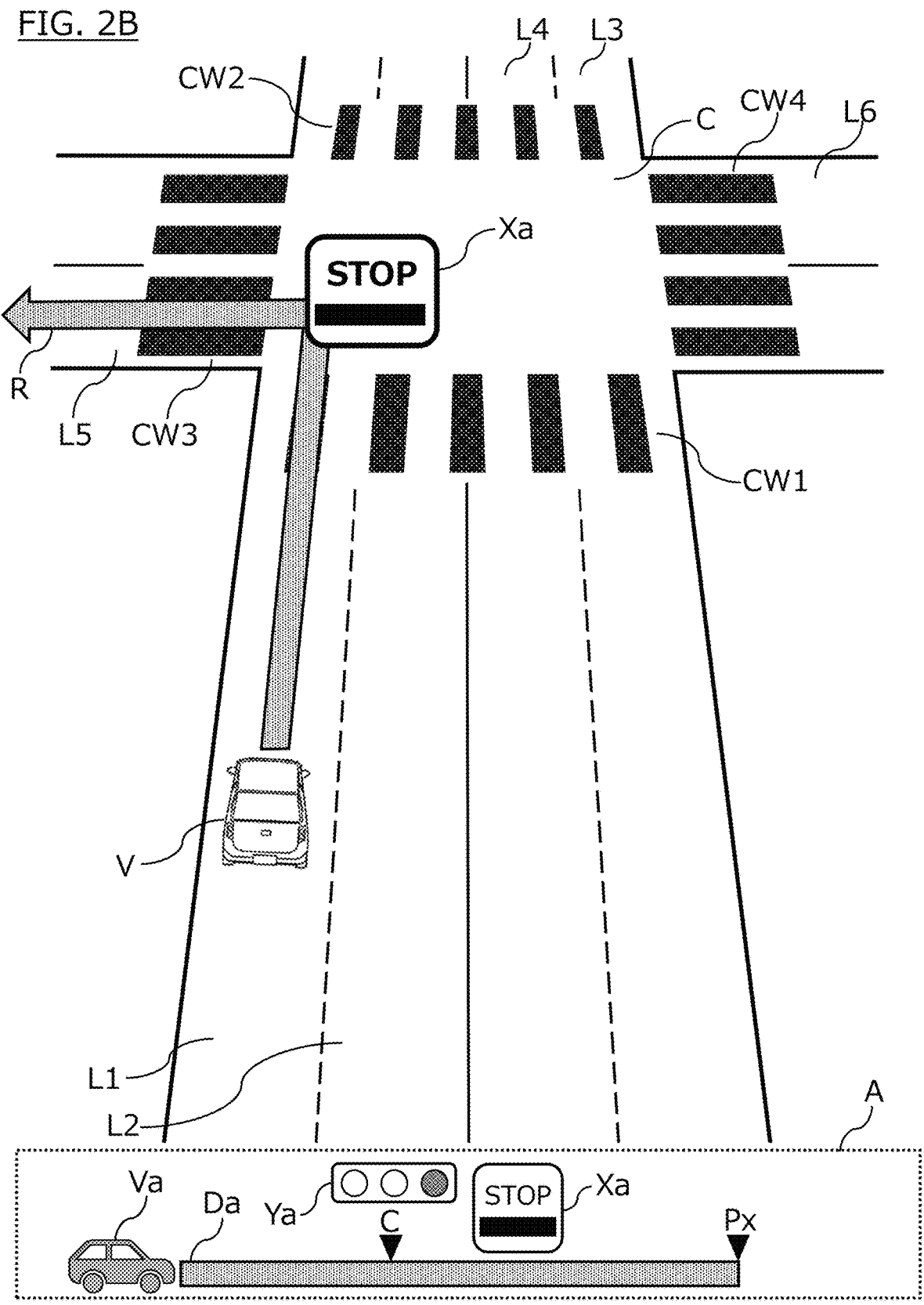
FIG. 2B is a diagram (part 2) illustrating an example of an image displayed when the driving assistance is executed by the driving assistance system illustrated in FIG. 1.

FIG. 2B illustrates an image displayed on the display device 18 when the state of the traffic light at the intersection C changes to a red light state after the image X is displayed in the travel scene illustrated in FIG. 2A. In the travel scene illustrated in FIG. 2B, as the subject vehicle V travels, the traveling position of the subject vehicle V in the lane L1 moves to a position closer to the intersection C, and the lengths of an image Da indicating the distances to the intersection C and the destination Px become shorter than those of the image D. In addition, the image illustrating the lighting state of the traffic light at the intersection C changes to an image Ya indicating the red light state.

In the travel scene illustrated in FIG. 2B, the state of the traffic light installed at the intersection C has become a red light state, so the subject vehicle V must make a stop before the intersection C. Accordingly, a determination is made that the subject vehicle V cannot pass through the intersection C (intersection area), and the driving assistance device 19 therefore changes the image X, which is information notifying that the subject vehicle V is approaching the intersection area, to an image Xa in accordance with the determination result. The image Xa is information that notifies the occupants of the subject vehicle V that the subject vehicle V will make a stop before the intersection C, and is displayed at the position of the intersection C. By displaying the image Xa, the occupants of the subject vehicle V can be notified that the subject vehicle V will make a stop at the position at which the image is displayed. In addition to this, the driving assistance device 19 can inform the occupants of the subject vehicle V that the subject vehicle V is executing a determination as to whether or not the vehicle can pass through the crosswalk CW1 and the intersection C. This allows the occupants of the subject vehicle V to be given appropriate information when approaching the intersection C.

The image Xa has a larger display portion than the image X, and the degree of emphasis is increased by using a bold font. This can increase the degree of emphasis of the display: In addition, as in the travel scene illustrated in FIG. 2B, when a traffic light is installed in the intersection area, the driving assistance device 19 may separately provide the occupants with information in accordance with a determination result as to whether or not an obstacle is present in the intersection area and information in accordance with the state of the traffic light. For example, in the case of the travel scene illustrated in FIG. 2B, the determination result as to whether or not an obstacle is present in the intersection area is displayed at the position of the intersection C, and the determination result as to whether or not the lighting state of the traffic light is a state of instructing to make a stop is displayed as the image Ya in the lower area A. This can further increase the degree of emphasis of the display.

Figure 2C:
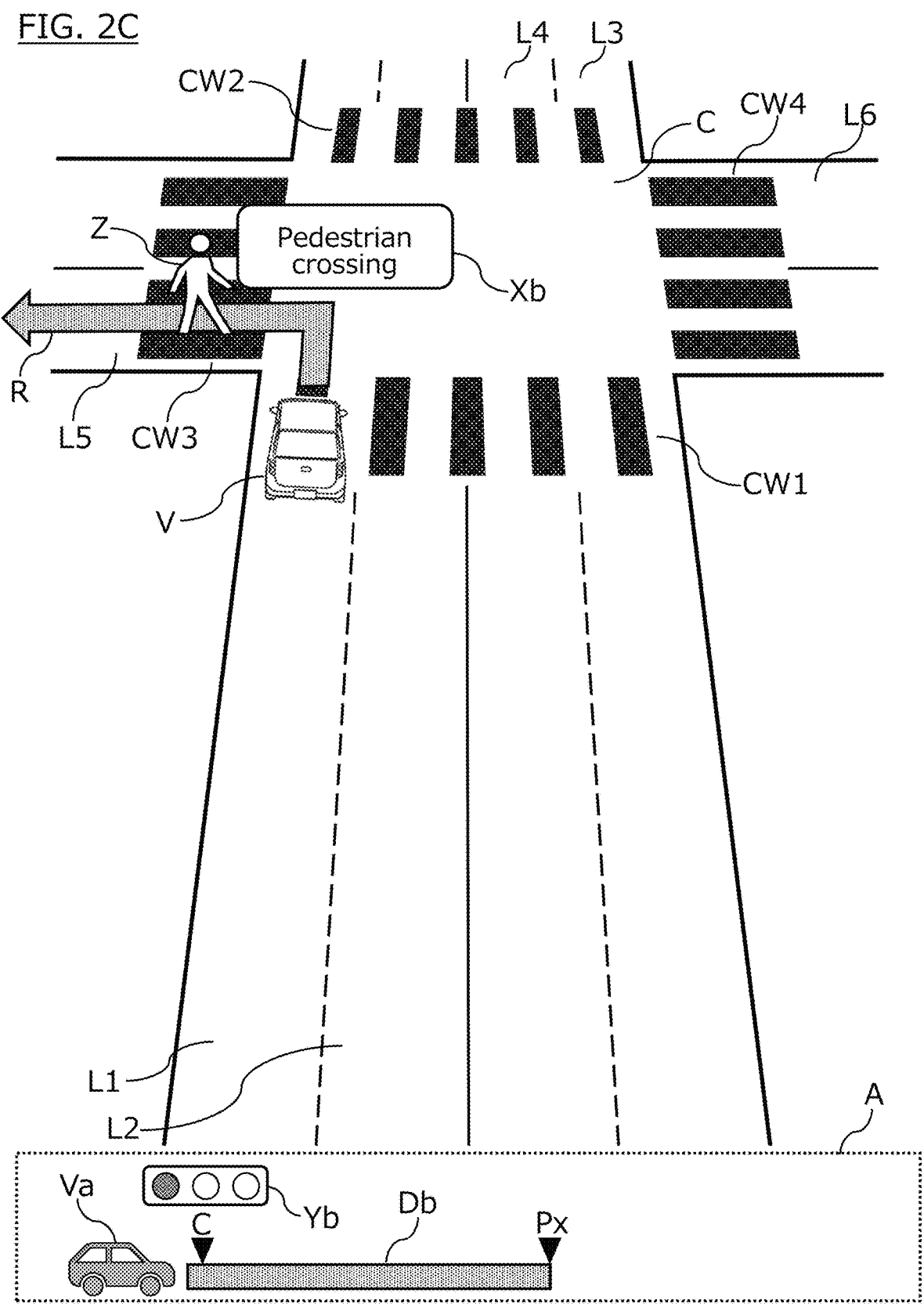
FIG. 2C is a diagram (part 3) illustrating an example of an image displayed when the driving assistance is executed by the driving assistance system illustrated in FIG. 1.

FIG. 2C illustrates an image to be displayed on the display device 18 when the image Xa is displayed in the travel scene illustrated in FIG. 2B, the subject vehicle V makes a stop at a position before the intersection C, and then the state of the traffic light changes to a green light state. In the travel scene illustrated in FIG. 2C, the subject vehicle V is traveling at a position on the crosswalk CW1, and the lengths of an image Db indicating the distances to the intersection C and the destination Px become shorter than those of the image Da. In addition, the image illustrating the lighting state of the traffic light at the intersection C changes to an image Yb indicating the green light state. Since the state of the traffic light installed at the intersection C is the green light state, the subject vehicle V does not need to make a stop before the intersection C. In the travel scene illustrated in FIG. 2C, therefore, the image Xa, which notifies the occupants that the subject vehicle V will make a stop before the intersection C, is not displayed.

In the travel scene illustrated in FIG. 2C, it is assumed that a pedestrian crossing the crosswalk CW3 is detected. In this case, in order to notify the occupants that a pedestrian is present on the crosswalk CW3, an image Z is displayed at the position of the crosswalk CW3. The image Z is an image that notifies the occupants of the presence of a pedestrian. Then, in order to notify the occupants that the subject vehicle V has stopped because a pedestrian is crossing, an image Xb with "Pedestrian crossing" written on it is displayed next to the image Z. That is, the image Xa is changed to the image Xb based on the determination as to whether or not the vehicle can pass through the intersection area in the travel scene illustrated in FIG. 2C. The image Xb has a smaller display portion than the image Xa, and the degree of emphasis is reduced by using a normal font instead of a bold font. After the pedestrian has completed crossing the crosswalk CW3, the display of the images Xb and Z is stopped (hidden), and the subject vehicle V turns left at the intersection C and enters the lane L5 using the driving assistance function of the control unit 20.

Specific examples of processing in the driving assistance device 19 will now be described for the cases in which the subject vehicle V turns left and right at the intersection C.

First, the case in which the subject vehicle V turns left at the intersection C will be described. When the subject vehicle V turns left along the travel route R at the intersection C provided with traffic lights, the driving assistance device 19 uses the travel environment recognition function of the recognition unit 22 to detect pedestrians and bicycles crossing the intersection C and the state of the traffic lights, thus recognizing the travel environment. The driving assistance device 19 then uses the passage determination function of the determination unit 23 to determine, based on the state of the traffic lights, whether or not the subject vehicle V can pass through the intersection area. When determining, based on the state of the traffic lights (specifically; the lighting state), that the subject vehicle V can pass through the intersection C, the driving assistance device 19 uses the approach notification function of the provision unit 24 to decrease the degree of emphasis of the display portion for the information to be provided to the occupants of the subject vehicle V. On the other hand, when determining, based on the state of the traffic lights, that the subject vehicle V cannot pass through the intersection C, the driving assistance device 19 increases the degree of emphasis of the display portion for the information to be provided to the occupants of the subject vehicle V or maintains the display portion for the information unchanged.

In addition, after determining, based on the state of the traffic lights, that the subject vehicle V can pass through the intersection C and decreasing the degree of emphasis of the display portion for the information, the driving assistance device 19 determines, based on the detection results of pedestrians and bicycles, whether or not the subject vehicle V can pass through the intersection C. Then, when determining, based on the detection results of the pedestrians and bicycles, that the subject vehicle can pass through the intersection C, the driving assistance device 19 stops providing the occupants with information as to whether or not the vehicle can pass through the intersection C. On the other hand, when determining, based on the detection results of the pedestrians and bicycles, that the subject vehicle V cannot pass through the intersection C, the driving assistance device 19 increases the degree of emphasis of the display portion for the information to be provided to the occupants or maintains the display portion for the information unchanged. This allows the information notifying that the subject vehicle V is approaching the intersection area to be changed stepwise in accordance with the determination as to whether or not the subject vehicle V can pass through the intersection area.

The case in which the subject vehicle V turns right at the intersection C will then be described. When the subject vehicle V turns right along the travel route R at the intersection C provided with traffic lights, the driving assistance device 19 uses the travel environment recognition function of the recognition unit 22 to detect pedestrians, bicycles, and oncoming vehicles of the subject vehicle V that cross the intersection C and the state of the traffic lights, thus recognizing the travel environment. In the case of the travel scene illustrated in FIG. 2A, the oncoming vehicles of the subject vehicle V are vehicles traveling in the lane L3 or lane L4. The driving assistance device 19 then uses the passage determination function of the determination unit 23 to determine, based on the state of the traffic lights (specifically, the lighting state), whether or not the subject vehicle V can pass through the intersection C. When determining, based on the state of the traffic lights, that the subject vehicle V can pass through the intersection C, the driving assistance device 19 uses the approach notification function of the provision unit 24 to decrease the degree of emphasis of the display portion for the information to be provided to the occupants of the subject vehicle V. On the other hand, when determining, based on the state of the traffic lights, that the subject vehicle V cannot pass through the intersection C, the driving assistance device 19 increases the degree of emphasis of the display portion for the information to be provided to the occupants of the subject vehicle V or maintains the display portion for the information unchanged.

In addition, after determining, based on the state of the traffic lights, that the subject vehicle V can pass through the intersection C and decreasing the degree of emphasis of the display portion for the information provided to the occupants of the subject vehicle V, the driving assistance device 19 determines, based on the detection results of the pedestrians, bicycles, and oncoming vehicles, whether or not the subject vehicle V can pass through the intersection C. Then, when determining, based on the detection results of the pedestrians, bicycles, and oncoming vehicles, that the subject vehicle V can pass through the intersection C, the driving assistance device 19 stops providing the occupants with information as to whether or not the vehicle can pass through the intersection C. On the other hand, when determining, based on the detection results of the pedestrians, bicycles, and oncoming vehicles, that the subject vehicle V cannot pass through the intersection C, the driving assistance device 19 increases the degree of emphasis of the display portion for the information to be provided to the occupants or the subject vehicle V or maintains the display portion for the information unchanged. This allows information notifying that the subject vehicle V is approaching the intersection area to be changed stepwise in accordance with the determination as to whether or not the subject vehicle V can pass through the intersection area.

<Processing in Driving Assistance System>

Figure 3A:
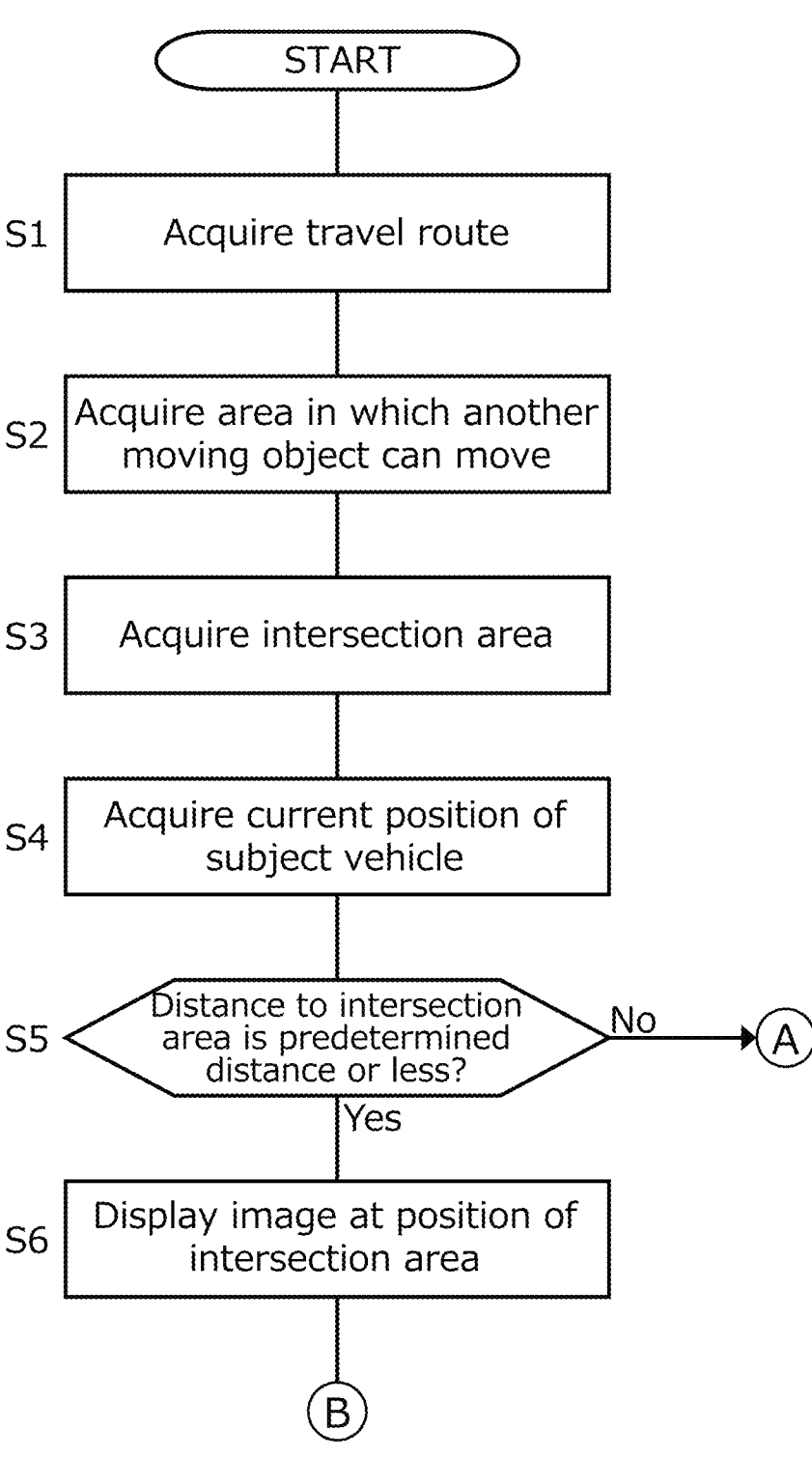
FIG. 3A is a flowchart (part 1) illustrating an example of a processing procedure in the driving assistance device of FIG. 1.
Figure 3B:
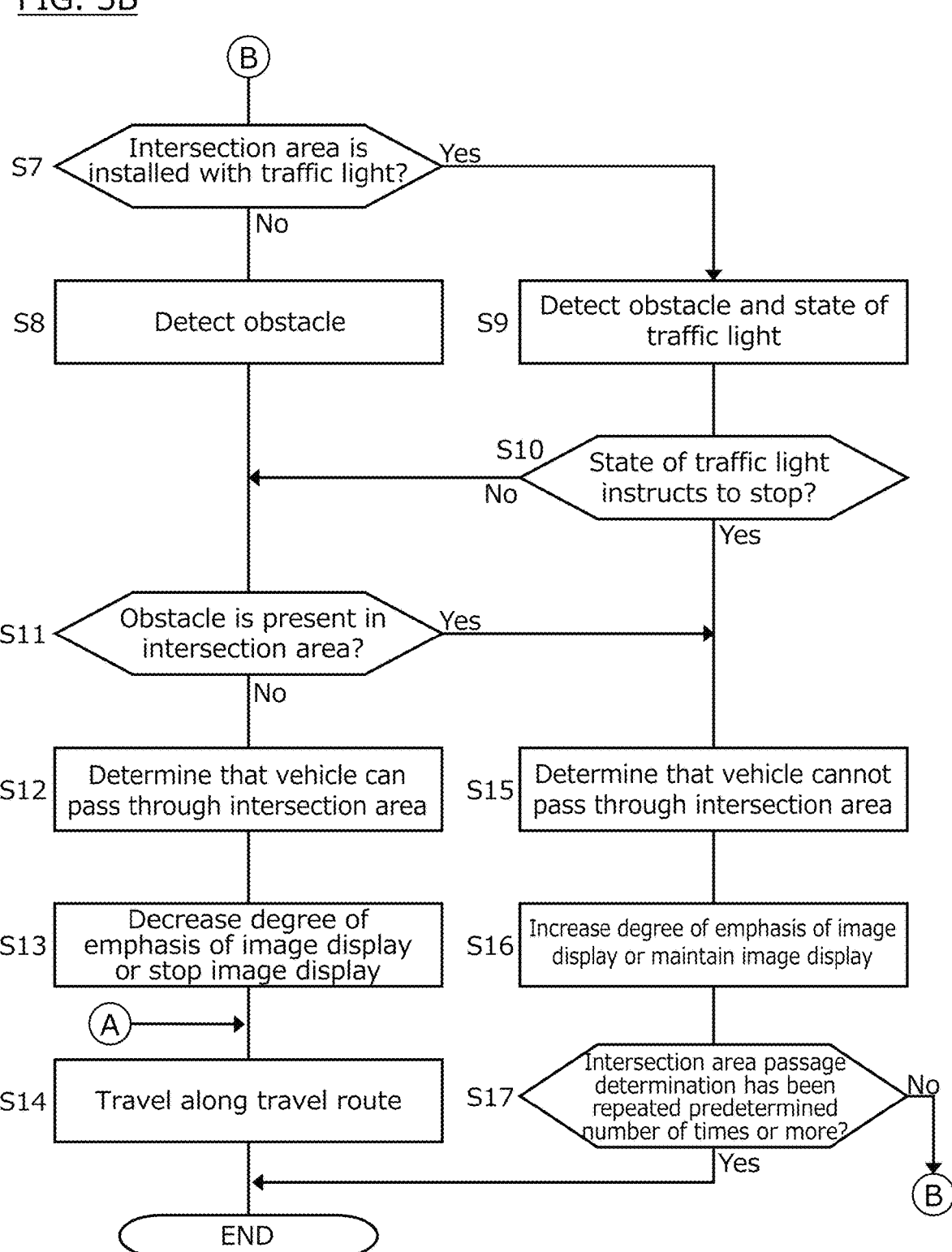
FIG. 3B is a flowchart (part 2) illustrating an example of a processing procedure in the driving assistance device of FIG. 1.

A procedure when the driving assistance device 19 processes information will be described with reference to FIGS. 3A to 3B. FIGS. 3A to 3B depict an example of a flowchart illustrating information processing executed in the driving assistance system 10 of the present embodiment. The processing described below is executed at predetermined time intervals by the CPU 191, which is a processor of the driving assistance device 19.

First, the intersection area acquisition function of the acquisition unit 21 is used in step S1 of FIG. 3A to acquire the travel route R from the navigation device 16, in subsequent step S2 to acquire from the map information 14 the area in which other moving objects can move, and in subsequent step S3 to acquire the intersection area. Then, in step S4, the travel environment recognition function of the recognition unit 22 is used to acquire the current position of the subject vehicle V from the position detection device 15, and in subsequent step S5, a determination is made whether or not the distance from the subject vehicle V to the intersection area is equal to or less than a predetermined distance. When a determination is made that the distance from the subject vehicle V to the intersection area exceeds the predetermined distance, the process proceeds to step S14 of FIG. 3B. Alternatively, step S5 may be repeated until the distance from the subject vehicle V to the intersection area becomes equal to or less than the predetermined distance. On the other hand, when a determination is made that the distance from the subject vehicle V to the intersection area is equal to or less than the predetermined distance, the process proceeds to step S6.

In step S6, the approach notification function of the provision unit 24 is used to display, at the position of the intersection area on the travel route displayed on the display device 18, an image notifying that the vehicle is approaching the intersection area. Step S6 is followed by step S7 of FIG. 3B, in which the passage determination function of the determining unit 23 is used to determine whether or not the intersection area is installed with a traffic light. When a determination is made that the intersection area is not installed with a traffic light, the process proceeds to step S8, in which an obstacle present in the intersection area is detected, and the process proceeds to step S11. On the other hand, when a determination is made that the intersection area is installed with a traffic light, the process proceeds to step S9, in which the state of the traffic light installed in the intersection area and an obstacle present in the intersection area are detected. Step 9 is followed by step S10, in which a determination is made whether or not the state of the traffic light instructs to make a stop. When a determination is made that the state of the traffic light instructs to make a stop, the process proceeds to step S15. On the other hand, when a determination is made that the state of the traffic light does not instruct to make a stop, the process proceeds to step S11. In step S11, a determination is made whether or not an obstacle is present in the intersection area. When a determination is made that no obstacle is present in the intersection area, the process proceeds to step S12, in which a determination is made that the subject vehicle V can pass through the intersection area.

When a determination is made in step S12 that the subject vehicle V can pass through the intersection area, the process proceeds to step S13. In step S13, the approach notification function of the provision unit 24 is used to decrease the degree of emphasis of the image display as to whether or not the vehicle can pass through the intersection area, or stop (hide) the image display: In subsequent step S14, the driving assistance function of the control unit 20 is used to autonomously control the travel of the subject vehicle V via the vehicle control device 17 so that the subject vehicle V travels along the travel route R. After that, the execution of the routine illustrated in FIG. 3 is stopped, and the display control process in the driving assistance device 19 is concluded.

On the other hand, when a determination is made that an obstacle is present in the intersection area, the process proceeds to step S15, in which a determination is made that the subject vehicle V cannot pass through the intersection area. This case is followed by step S16, in which the approach notification function of the provision unit 24 is used to increase the degree of emphasis of the image display as to whether or not the subject vehicle V can pass through the intersection area, or maintain the image display. In subsequent step S17, a determination is made whether or not the intersection area passage determination has been repeated a predetermined number of times (e.g., five times) or more. When a determination is made that the intersection area passage determination has not been repeated the predetermined number of times, the process proceeds to step S7, from which the intersection area passage determination is repeated. On the other hand, when a determination is made that the intersection area passage determination has been repeated the predetermined number of times or more, the execution of the routine illustrated in FIG. 3 is stopped, and the display control process in the driving assistance device 19 is concluded. Then, the driving assistance function of the control unit 20 is used to request the driver to drive manually.

EMBODIMENTS OF PRESENT INVENTION

As described above, the present embodiment provides an information providing device comprising: an acquisition unit 21 configured to acquire an intersection area on a travel route R that is set by autonomous travel control, the intersection area intersecting with an area in which another moving object can move: a recognition unit 22 configured to recognize a travel environment around a subject vehicle V: a determination unit 23 configured to determine, based on the travel environment, whether or not the subject vehicle V can pass through the intersection area; and a provision unit 24 configured to provide an onboard terminal and/or an electronic terminal in the subject vehicle V with information that notifies that the subject vehicle V is approaching the intersection area. The provision unit 24 changes the information in accordance with a determination result of the determination unit 23 while the subject vehicle V is traveling to the intersection area. This allows the occupants of the vehicle to be provided with appropriate information when the vehicle approaches an intersection area such as the intersection C, and it is possible to suppress the anxious feeling given to the occupants of the vehicle.

Moreover, according to the information providing device of the present embodiment, the intersection area includes an intersection, a crosswalk, and a sidewalk facing a facility that allows the subject vehicle to enter. This allows the intersection area to be recognized more accurately.

Furthermore, according to the information providing device of the present embodiment, the provision unit 24 changes at least one of color, brightness, and size of a display portion for the information. This allows the information to be changed more effectively.

In addition, according to the information providing device of the present embodiment, the provision unit 24, when the determination unit 23 determines that the subject vehicle V cannot pass through the intersection area, increases a degree of emphasis of the display portion for the information, and when the determination unit 23 determines that the subject vehicle V can pass through the intersection area, decreases the degree of emphasis of the display portion for the information or stops provision of the information. This allows the occupants of the vehicle to be notified that the determination has been made as to whether or not the subject vehicle V, when approaching an intersection area such as the intersection C, can pass through the intersection area, and it is possible to suppress the anxious feeling given to the occupants of the vehicle.

Moreover, according to the information providing device of the present embodiment, the provision unit 24 executes at least one of: displaying the information together with the distance from the subject vehicle V to the intersection area: displaying the information at the position of the intersection area on the travel route R displayed on the display device 18; and displaying the information superimposed on an image of outside of the vehicle acquired from the imaging device 11. This allows the information to be effectively displayed to the occupants of the vehicle.

Furthermore, according to the information providing device of the present embodiment, the provision unit 24, when the determination unit 23 determines that the subject vehicle V can pass through the intersection area, decreases the degree of emphasis of the display portion for the information even before the subject vehicle V passes through the intersection area. This allows the occupants of the vehicle to be notified early that the determination has been made as to whether or not the subject vehicle V, when approaching an intersection area such as the intersection C, can pass through the intersection area, and it is possible to suppress the anxious feeling given to the occupants of the vehicle.

In addition, according to the information providing device of the present embodiment, the recognition unit 22, when a traffic light is present ahead of the subject vehicle V, detects as the travel environment an obstacle present around the subject vehicle V and a state of the traffic light, and the determination unit 23 determines whether or not the obstacle is present in the intersection area and whether or not the state of the traffic light is a state of instructing to make a stop, and when determining that the obstacle is not present in the intersection area and that the state of the traffic light is not a state of instructing to make a stop, determines that the subject vehicle V can pass through the intersection area. Through this operation, when the intersection area is installed with a traffic light, it is possible to appropriately determine whether or not the subject vehicle V can pass through the intersection area.

Moreover, according to the information providing device of the present embodiment, the provision unit 24 provides the onboard terminal and/or the electronic terminal separately with information in accordance with the determination result as to whether or not the obstacle is present in the intersection area and information in accordance with the determination result as to whether or not the state of the traffic light is a state of instructing to make a stop. This allows the environment of the intersection area to be expressed in more detail.

Furthermore, according to the information providing device of the present embodiment, the determination unit 23, when the subject vehicle V makes a stop before the intersection area and then makes a start, determines whether or not the subject vehicle can pass through the intersection area. Through this operation, it is possible to more reliably execute the determination as to whether or not the subject vehicle V can pass through the intersection area.

In addition, according to the information providing device of the present embodiment, the recognition unit 22, when the subject vehicle V turns left along the travel route R at the intersection C provided with a traffic light, detects as the travel environment a pedestrian and a bicycle that cross the intersection C and a state of the traffic light, the determination unit 23 determines, based on the state of the traffic light, whether or not the subject vehicle V can pass through the intersection C, the provision unit 24, when the determination unit 23 determines, based on the state of the traffic light, that the subject vehicle V can pass through the intersection C, decreases a degree of emphasis of a display portion for the information, the determination unit 23, after decreasing the degree of emphasis, determines, based on detection results of the pedestrian and the bicycle, whether or not the subject vehicle V can pass through the intersection C. and the provision unit 24, when the determination unit 23 determines, based on the detection results of the pedestrian and the bicycle, that the subject vehicle V can pass through the intersection C, stops provision of the information. This allows the information to be effectively displayed to the occupants of the subject vehicle V when it turns left.

Moreover, according to the information providing device of the present embodiment, the recognition unit 22, when the subject vehicle V turns right along the travel route R at the intersection C provided with a traffic light, detects as the travel environment a pedestrian, a bicycle, and an oncoming vehicle of the subject vehicle V that cross the intersection C and a state of the traffic light, the determination unit 23 determines, based on the state of the traffic light, whether or not the subject vehicle V can pass through the intersection C, the provision unit 24, when the determination unit 23 determines, based on the state of the traffic light, that the subject vehicle V can pass through the intersection C, decreases a degree of emphasis of a display portion for the information, the determination unit 23, after decreasing the degree of emphasis, determines, based on detection results of the pedestrian, the bicycle, and the oncoming vehicle, whether or not the subject vehicle V can pass through the intersection C, and the provision unit 23, when the determination unit 23 determines, based on the detection results of the pedestrian, the bicycle, and the oncoming vehicle, that the subject vehicle V can pass through the intersection C, stops provision of the information. This allows the information to be effectively displayed to the occupants of the subject vehicle V when it turns right.

Furthermore, according to the information providing device of the present embodiment, the provision unit 24 displays the information on at least one of a display equipped in the subject vehicle V, a display included in a terminal for monitoring travel of the subject vehicle V, and a display on a terminal of an occupant of the subject vehicle. Through this operation, it is possible to more reliably provide even a person supervising the travel of the vehicle with information as to whether or not the vehicle can pass through the intersection area.

In addition, the present embodiment provides an information providing method executed using a processor, wherein the processor is configured to: acquire an intersection area on a travel route R that is set by autonomous travel control, the intersection area intersecting with an area in which another moving object can move: recognize a travel environment around a subject vehicle V; determine, based on the travel environment, whether or not the subject vehicle V can pass through the intersection area; provide an onboard terminal and/or an electronic terminal in the subject vehicle V with information that notifies that the subject vehicle V is approaching the intersection area; and while the subject vehicle V is traveling to the intersection area, change the information in accordance with a determination result as to whether or not the subject vehicle V can pass through the intersection area. This allows the occupants of the vehicle to be provided with appropriate information when the vehicle approaches an intersection area such as the intersection C, and it is possible to suppress the anxious feeling given to the occupants of the vehicle.

| Description of Reference Numerals | |
|---|---|
| 10 | Driving assistance system |
| 11 | Imaging device |
| 12 | Ranging device |
| 13 | State detection device |
| 14 | Map information |
| 15 | Position detection device |
| 16 | Navigation device |
| 17 | Vehicle control device |
| 171 | Vehicle speed control device |
| 172 | Steering control device |

-continued

| Description of Reference Numerals | |
|---|---|
| 18 | Display device |
| 19 | Driving assistance device (information providing device) |
| 191 | CPU (processor) |
| 192 | ROM |
| 193 | RAM |
| 20 | Control unit |
| 21 | Acquisition unit |
| 22 | Recognition unit |
| 23 | Determination unit |
| 24 | Provision unit |
| A | Area |
| C | Intersection |
| CW1, CW2, CW3, CW4 | Crosswalk |
| L1, L2, L3, L4, L5, L6 | Lane |
| Px | Destination |
| R | Travel route |
| V | Subject vehicle |
| D, Da, Db, Va, X, Xa, Xb, Y, Ya, Yb, Z | Image |

The invention claimed is:

1. An information providing device comprising:

an acquisition unit configured to acquire an intersection area on a travel route, the intersection area intersecting with an area in which another moving object can move;

a recognition unit configured to recognize a travel environment around a subject vehicle;

a determination unit configured to determine, based on the travel environment, whether or not the subject vehicle can pass through the intersection area; and a provision unit configured to provide an onboard terminal and/or an electronic terminal in the subject vehicle with information that notifies that the subject vehicle is approaching the intersection area, wherein the provision unit changes the information in accordance with a determination result of the determination unit while the subject vehicle is traveling to the intersection area, the intersection area includes an intersection provided with a traffic light, the recognition unit, when the subject vehicle turns right or left at the intersection, detects as the travel environment an obstacle present at the intersection and a state of the traffic light, the determination unit determines, based on the state of the traffic light, whether or not the subject vehicle can pass through the intersection, the provision unit, when the determination unit determines, based on the state of the traffic light, that the subject vehicle can pass through the intersection, decreases a degree of emphasis of a display portion for the information, the determination unit, after the provision unit decreases the degree of emphasis, determines, based on a detection result of the obstacle present at the intersection, whether or not the subject vehicle can pass through the intersection, and the provision unit, when the determination unit determines, based on the detection result of the obstacle present at the intersection, that the vehicle can pass through the intersection, hides the display portion for the information, or stops provision of the information.

2. The information providing device according to claim 1, wherein the intersection area includes an intersection, a crosswalk, and a sidewalk facing a facility that allows the subject vehicle to enter.

3. The information providing device according to claim 1, wherein the provision unit changes at least one of color, brightness, and size of a display portion for the information.

4. The information providing device according to claim 1, wherein the provision unit, when the determination unit determines that the subject vehicle cannot pass through the intersection area, increases a degree of emphasis of a display portion for the information, and when the determination unit determines that the subject vehicle can pass through the intersection area, decreases the degree of emphasis of the display portion for the information or stops provision of the information.

5. The information providing device according to claim 1, wherein the provision unit executes at least one of:

displaying the information together with a distance from the subject vehicle to the intersection area;

displaying the information at a position of the intersection area on the travel route displayed on a display device; and displaying the information superimposed on an image of outside of the vehicle acquired from an imaging device.

6. The information providing device according to claim 1, wherein the provision unit, when the determination unit determines that the subject vehicle can pass through the intersection area, decreases a degree of emphasis of a display portion for the information even before the subject vehicle passes through the intersection area.

7. The information providing device according to claim 1, wherein the recognition unit, when a traffic light is present ahead of the subject vehicle, detects as the travel environment an obstacle present around the subject vehicle and a state of the traffic light, and the determination unit determines whether or not the obstacle is present in the intersection area and whether or not the state of the traffic light is a state of instructing to make a stop, and when determining that the obstacle is not present in the intersection area and that the state of the traffic light is not a state of instructing to make a stop, determines that the subject vehicle can pass through the intersection area.

8. The information providing device according to claim 7, wherein the provision unit provides the onboard terminal and/or the electronic terminal separately with information in accordance with a determination result as to whether or not the obstacle is present in the intersection area and information in accordance with a determination result as to whether or not the state of the traffic light is a state of instructing to make a stop.

9. The information providing device according to claim 1, wherein the determination unit, when the subject vehicle makes a stop before the intersection area and then makes a start, determines whether or not the subject vehicle can pass through the intersection area.

10. The information providing device according to claim 1, wherein the recognition unit, when the subject vehicle turns left along the travel route at an intersection provided with a traffic light, detects as the travel environment a pedestrian and a bicycle that cross the intersection and a state of the traffic light, the determination unit determines, based on the state of the traffic light, whether or not the subject vehicle can pass through the intersection, the provision unit, when the determination unit determines, based on the state of the traffic light, that the subject vehicle can pass through the intersection, decreases a degree of emphasis of a display portion for the information, the determination unit, after decreasing the degree of emphasis, determines, based on detection results of the pedestrian and the bicycle, whether or not the subject vehicle can pass through the intersection, and the provision unit, when the determination unit determines, based on the detection results of the pedestrian and the bicycle, that the subject vehicle can pass through the intersection, stops provision of the information.

11. The information providing device according to claim 1, wherein the recognition unit, when the subject vehicle turns right along the travel route at an intersection provided with a traffic light, detects as the travel environment a pedestrian, a bicycle, and an oncoming vehicle of the subject vehicle that cross the intersection and a state of the traffic light, the determination unit determines, based on the state of the traffic light, whether or not the subject vehicle can pass through the intersection, the provision unit, when the determination unit determines, based on the state of the traffic light, that the subject vehicle can pass through the intersection, decreases a degree of emphasis of a display portion for the information, the determination unit, after decreasing the degree of emphasis, determines, based on detection results of the pedestrian, the bicycle, and the oncoming vehicle, whether or not the subject vehicle can pass through the intersection, and the provision unit, when the determination unit determines, based on the detection results of the pedestrian, the bicycle, and the oncoming vehicle, that the subject vehicle can pass through the intersection, stops provision of the information.

12. The information providing device according to claim 1, wherein the provision unit displays the information on at least one of a display equipped in the subject vehicle, a display included in a terminal for monitoring travel of the subject vehicle, and a display on a terminal of an occupant of the subject vehicle.

13. An information providing method executed using a processor, wherein the processor is configured to:

acquire an intersection area on a travel route, the intersection area intersecting with an area in which another moving object can move;

recognize a travel environment around a subject vehicle;

determine, based on the travel environment, whether or not the subject vehicle can pass through the intersection area, the intersection area including an intersection provided with a traffic light;

provide an onboard terminal and/or an electronic terminal in the subject vehicle with information that notifies that the subject vehicle is approaching the intersection area;

while the subject vehicle is traveling to the intersection area, change the information in accordance with a determination result as to whether or not the subject vehicle can pass through the intersection area;

when the subject vehicle turns right or left at the intersection, detect as the travel environment an obstacle present at the intersection and a state of the traffic light;

determine, based on the state of the traffic light, whether or not the subject vehicle can pass through the intersection;

when determining, based on the state of the traffic light, that the subject vehicle can pass through the intersection, decrease a degree of emphasis of a display portion for the information;

after decreasing the degree of emphasis, determine, based on a detection result of the obstacle present at the intersection, whether or not the subject vehicle can pass through the intersection; and when determining, based on the detection result of the obstacle present at the intersection, that the vehicle can pass through the intersection, hide the display portion for the information, or stop provision of the information.

* * * * *